United States Patent
Shin

(10) Patent No.: US 9,596,441 B2
(45) Date of Patent: Mar. 14, 2017

(54) APPARATUS AND METHOD FOR CORRECTING IMAGE FOR IMAGE PROJECTION DEVICE WITH COGNITIVE FUNCTION ON USER AND ENVIRONMENT

(71) Applicant: Electronics and Telecommunications Research Institute, Daejeon (KR)

(72) Inventor: Ho Chul Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/449,017

(22) Filed: Jul. 31, 2014

(65) Prior Publication Data
US 2015/0189248 A1    Jul. 2, 2015

(30) Foreign Application Priority Data
Jan. 2, 2014    (KR) ........................ 10-2014-0000064

(51) Int. Cl.
*H04N 9/31*    (2006.01)

(52) U.S. Cl.
CPC ......... *H04N 9/3182* (2013.01); *H04N 9/3185* (2013.01); *H04N 9/3194* (2013.01)

(58) Field of Classification Search
CPC .......... H04N 9/31; G03B 21/14; G03B 21/16; F21V 29/00; H01J 61/52; H01J 61/82; H05B 41/14; H05B 41/36
See application file for complete search history.

(56) References Cited

U.S. PATENT DOCUMENTS

| 2003/0042401 | A1* | 3/2003 | Gartner ................ G01B 11/245 250/208.1 |
| 2007/0099700 | A1* | 5/2007 | Solomon ............. G07F 17/3211 463/34 |
| 2010/0309390 | A1* | 12/2010 | Plut ..................... H04N 9/3147 348/744 |

FOREIGN PATENT DOCUMENTS

KR    10-2007-0072324 A    7/2007

* cited by examiner

*Primary Examiner* — Sultan Chowdhury
*Assistant Examiner* — Danell L Owens

(57) ABSTRACT

Disclosed is a method of correcting an input image when projecting the input image using an image projection device. The method includes obtaining information on a projection surface on which the input image is to be projected and information on a user's position through at least one image sensor, performing geometric correction on the input image based on the information on the projection surface and the information on the user's position, performing color correction on the input image based on the information on the projection surface, and performing brightness correction on the input image based on the information on the projection surface.

16 Claims, 12 Drawing Sheets

APPARATUS AND METHOD FOR CORRECTING IMAGE FOR IMAGE PROJECTION DEVICE WITH COGNITIVE FUNCTION ON USER AND ENVIRONMENT

Priority to Korean patent application number 10-2014-0000064 filed on Jan. 2, 2014, the entire disclosure of which is incorporated by reference herein, is claimed.

BACKGROUND OF THE INVENTION

Field of the Invention

The present invention relates to an apparatus and method for correcting color-shape-location of an image for an image projection device such as a beam projection with a cognitive function on a user and environment, which may provide an optimized screen and function to the user by recognizing the user and the surrounding environment in an arbitrary environment.

Discussion of the Related Art

The conventional image projection device has needed a projection surface which is plane and has homogenous background color for effective image output, but a need of using the image projection device even under various bad conditions is on the increase as mobile devices and small image projection devices are introduced.

In particular, there is a need of a technology for implementing an undistorted image from the perspective of a single user by projecting an image on an arbitrary adjacent object through an image projection device even under a situation where there is no normal image screen or even a general wall in the vicinity.

Recently, a technology of implementing an image close to normal color for a wall surface stained with an arbitrary shape and color through color correction has been introduced, but a technology of overcoming even the case where the projected surface itself is significantly beyond the plane has not yet been developed, and thus there is a need for an advanced technology for implementing an optimized image to a single user by recognizing the relation between user—image projection device—image projection surface, and correcting a projected image.

SUMMARY OF THE INVENTION

An object of the present invention is to provide a method and apparatus for correcting an image for an image projection apparatus to which a user and environment recognition function has been added.

Another object of the present invention is to provide a method and apparatus for projecting an image without image distortion even when the image is projected on a projection surface having heterogeneous color and/or shape.

Another object of the present invention is to provide a method and apparatus for correcting a projected image in consideration of a user's (or viewer's) position so that the user may view the image without distortion.

Another object of the present invention is to provide a method and apparatus for providing an optimized projection image from the perspective of a user (or a viewer) in consideration of the shape, color, and the user's position.

In accordance with an aspect of the present invention, a method of correcting an input image when projecting the input image using an image projection device includes obtaining information on a projection surface on which the input image is to be projected and information on a user's position through at least one image sensor, performing geometric correction on the input image based on the information on the projection surface and the information on the user's position, performing color correction on the input image based on the information on the projection surface, and performing brightness correction on the input image based on the information on the projection surface.

In accordance with another aspect of the present invention, a method of correcting an input image when projecting the input image using an image projection device includes obtaining information on a shape and position of a projection surface on which the input image is to be projected through at least one image sensor, and performing geometric correction on the input image based on information on the shape and position of the projection surface and information on the user's position, wherein relative position information of the projection surface on the user is detected based on the information on the position of the projection surface and the information on the user's position, a virtual plane on the user is set based on the relative position information, and the geometric correction on the input image is performed based on the virtual plane.

In accordance with yet another aspect of the present invention, an image correction apparatus for an image projection device includes at least one image sensor which obtains information on a projection surface on which an input image is to be projected through the image projection device, and information on a user's position, a relative coordinate calculation unit which calculates a relative position of the projection surface on the user based on the information on the projection surface and the information on the user's position, and generates a virtual plane, a projection surface state detection unit which detects information on at least one of a shape, material, color, and light condition of the projection surface based on the information on the projection surface, and an input image correction unit which corrects the input image based on the virtual plane and the state information of the projection surface.

DETAILED DESCRIPTION OF THE EMBODIMENTS

Figure 1:
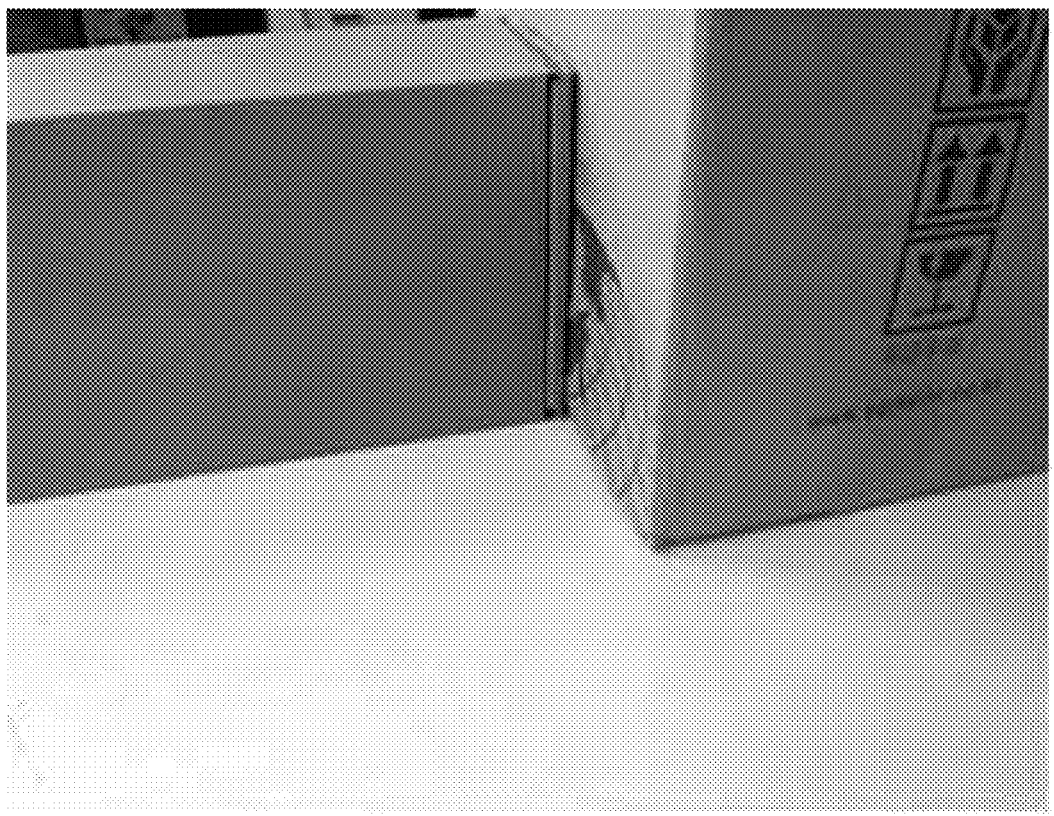
FIG. 1 shows an example of an arbitrary projection surface where an image is projected.

Hereinafter, embodiments of the present invention will be described in detail with reference to the accompanying drawings so that they can be readily implemented by those skilled in the art.

Hereinafter, some embodiments of the present invention are described in detail with reference to the accompanying drawings in order for a person having ordinary skill in the art to which the present invention pertains to be able to readily implement the invention. It is to be noted the present invention may be implemented in various ways and is not limited to the following embodiments. Furthermore, in the drawings, parts not related to the present invention are omitted in order to clarify the present invention and the same or similar reference numerals are used to denote the same or similar elements.

The objects and effects of the present invention can be naturally understood or become clear by the following description, and the objects and effects of the present invention are not restricted by the following description only.

The objects, characteristics, and merits will become more apparent from the following detailed description. Furthermore, in describing the present invention, a detailed description of a known art related to the present invention will be omitted if it is deemed to make the gist of the present invention unnecessarily vague. A preferred embodiment in accordance with the present invention is described in detail below with reference to the accompanying drawings.

FIG. 1 shows an example of an arbitrary projection surface where an image is projected. As mobile devices such as smart phones and small image projection devices (e.g., a beam projector) are introduced, the need for using image projection devices in various environments is on the increase. According to the conventional art, the projection surfaces which are plane and have homogeneous background color have been used for an effective image output. However, as such small image projection devices are used as in FIG. 1, there may be no projection surface, which is plane and has homogeneous background color, in the place which is to project the image, and an image may need to be projected on the projection surface which is not plane and has heterogeneous background color.

Figure 2:
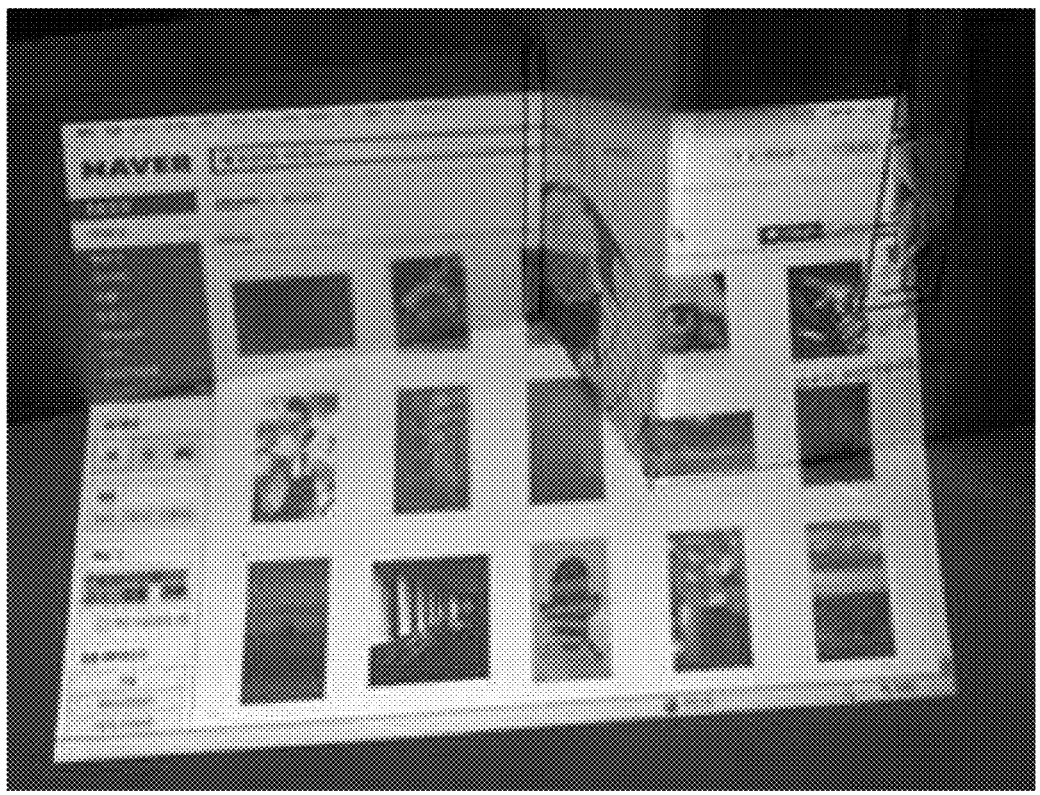
FIG. 2 is an example of an image projected on an arbitrary projection surface.

FIG. 2 is an example of an image projected on an arbitrary projection surface. When an image is projected on a projection surface, which is not plane and has heterogeneous background color as in FIG. 1, using an image projection device, the shape and color of the image may be distorted as in FIG. 2. In order to solve the problem, there is a need for a method of recognizing an image output environment, recognizing the user's (or viewer's) position, and providing an image which is not distorted from the perspective of the user.

Referring to FIG. 2, when an image is projected on the surface through the conventional image projection device, the color and shape of the image is inevitably distorted. In order to solve such a problem, an appropriate correction may need to be performed in consideration of the relationship between the user's position and the image projection surface by recognizing the image output environment and the user's position. Furthermore, in order to solve the problem, a geometrical correction on the relationship between the user and the surface shape, color correction on the surface material and color, and brightness correction on the light condition are needed.

Figure 3:
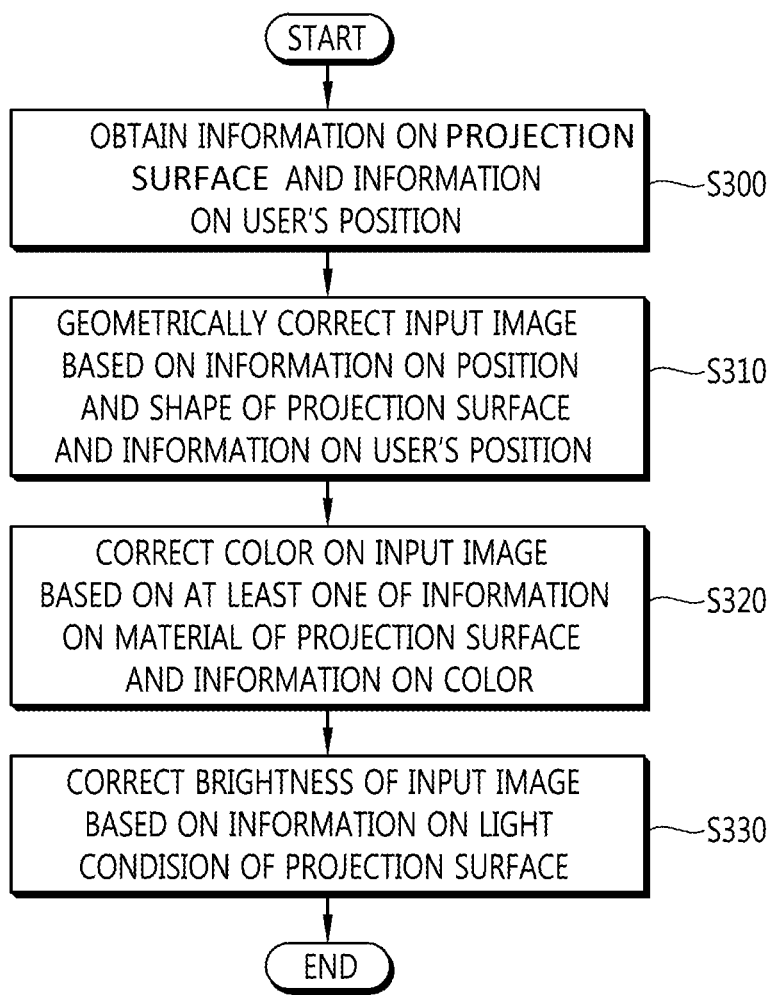
FIG. 3 shows a method of correcting an image in consideration of a user and a projection surface according to an embodiment of the present invention.

FIG. 3 shows a method of correcting an image in consideration of a user and a projection surface according to an embodiment of the present invention. The image correction method may be performed by the image correction device, and the image correction device may be included in the image projection device or may be implemented as a separate device outside the image projection device.

Referring to FIG. 3, the image correction device obtains information on the projection surface and information on the user's position (S300). Here, the user may include a viewer. Here, the information on the projection surface may include information on at least one of the position, shape, material, color, and light condition.

When the image correction device is included in the image projection device and obtains information on the projection surface and information on the user's position based on one or more image sensors, the image projection device, for example, may be implemented as follows. Hereinafter, the case where the image correction device is included in the image projection device will be described below, but it is also possible for the image correction device to be implemented as a separate device outside the image projection device.

Figure 4:
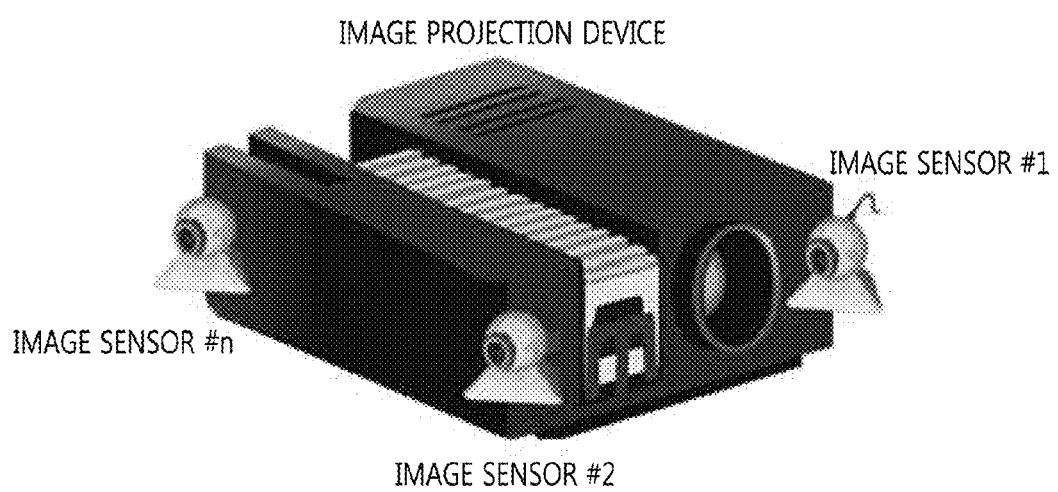
FIG. 4 is an example of an image projection device including one or more image sensors.

FIG. 4 is an example of an image projection device including one or more image sensors.

Referring to FIG. 4, the image projection device includes one or more image sensors (#1, #2, . . . , #n). The image projection device may obtain information on the projection surface and information on the user's position through one or more image sensors. In particular, the image projection device may obtain the distance image through the image sensors (#1, #2, . . . , #n) and may obtain the user's location information on the image projection device and location information of the projection surface based on the obtained distance image. A distance image camera based on a stereo vision, time of flight (TOF) or structured light, etc. may be used as the at least one image sensor.

Furthermore, the image projection device may obtain information on the material and color of the projection surface through the at least one image sensor and divide the projection surface by analyzing the obtained information. Furthermore, the image projection device may obtain information on the light environment where the projection image is to be projected through the brightness of the image obtained by the image sensor and the gain value of the camera.

Figure 5:
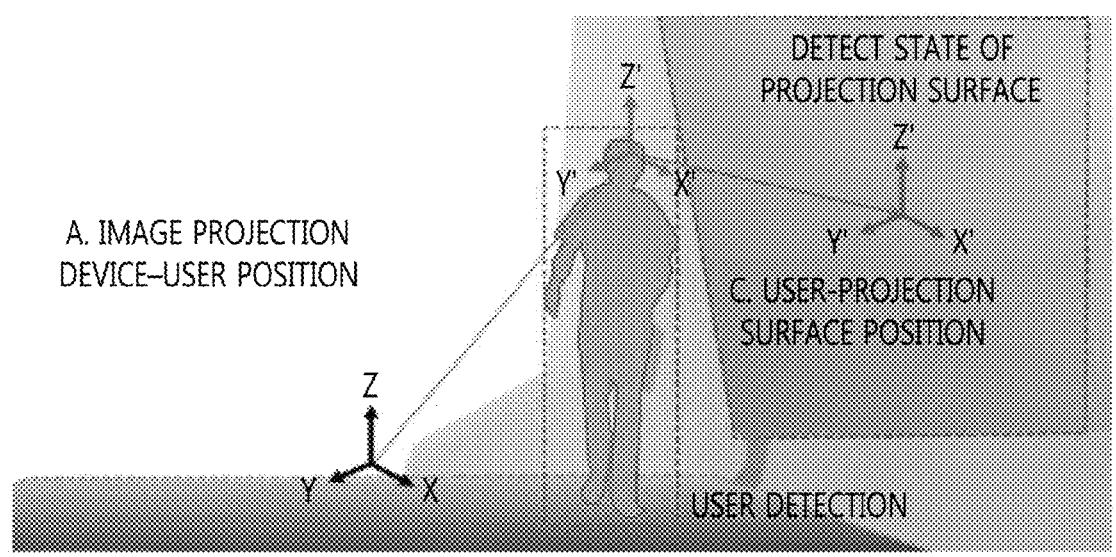
FIG. 5 is an example of a distance image between a user and a projection surface which are detected in a real environment.

FIG. 5 is an example of a distance image between a user and a projection surface which are detected in a real environment. The distance image is an image which expresses the distance on each pixel as information such as brightness and color, and in the example of FIG. 5, the image has been more brightly expressed as the distance to the object gets closer.

Referring to FIG. 3 again, the image correction device performs geometrical correction on the input image based on the information on the position of the projection surface and shape among the information on the user's position and the information on the projection surface (S310). As described above, the image correction device may calculate (or obtain)

the relative position of the projection surface for the user based on the obtained location information of the user and projection surface.

Figure 6:
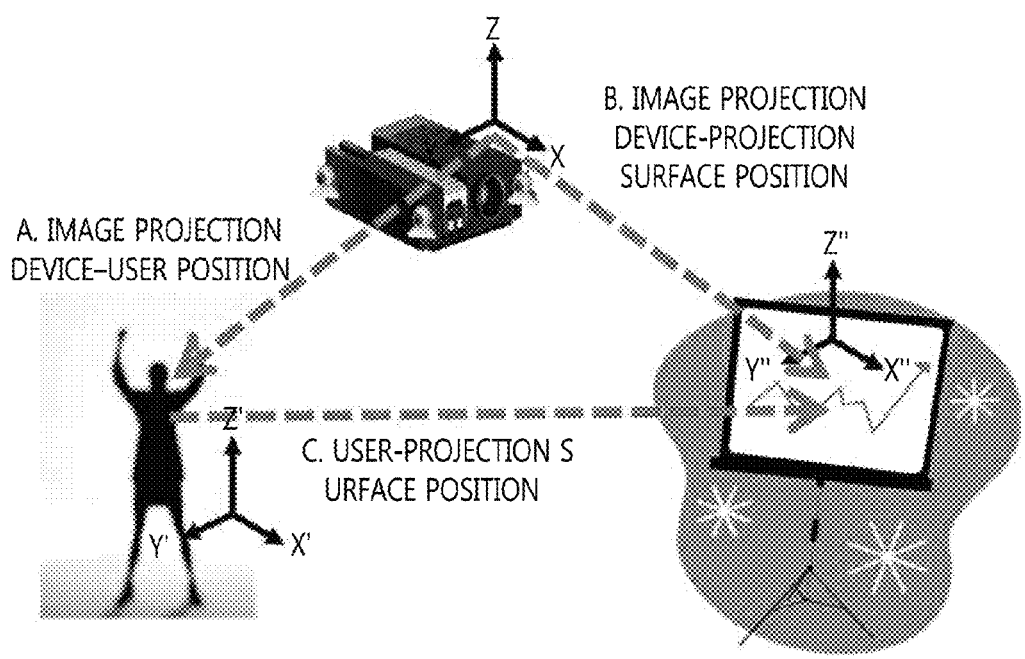
FIG. 6 is an example of location calculation of a projection surface relative to a user according to the present invention.

FIG. 6 is an example of location calculation of a projection surface relative to a user according to the present invention.

Referring to FIG. 6, the image correction device may obtain relative location information between the user and the projection surface based on the location information between the image projection device and the user and the location information between the image projection device and the projection surface.

Figure 7:
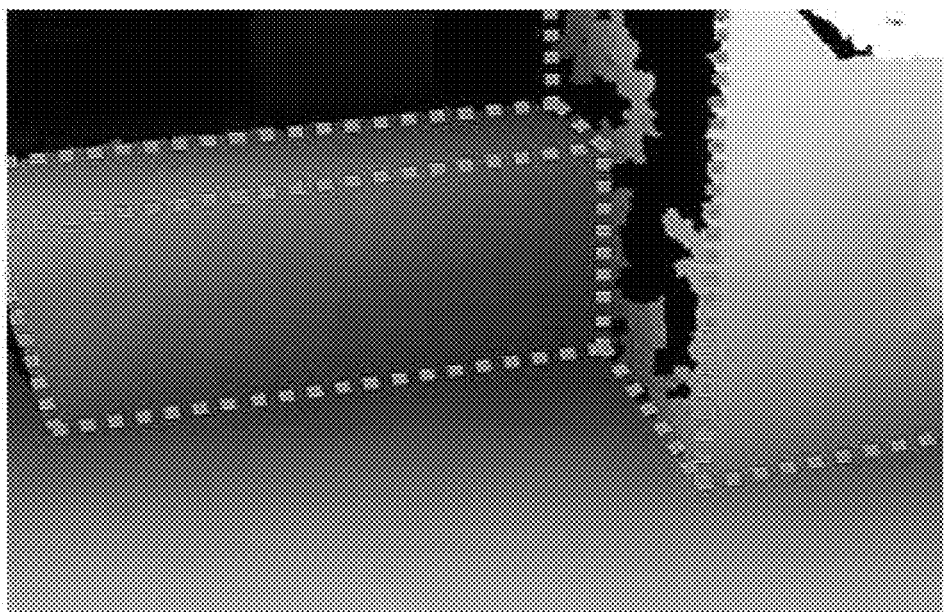
FIG. 7 is an example of a result of recognizing the structure of a projection surface and recognizing the shape by utilizing distance image information.

FIG. 7 is an example of a result of recognizing the structure of a projection surface and recognizing the shape by utilizing distance image information. The image correction device may obtain geometric information of the projection surface as in FIG. 7 by utilizing the above-described distance image information.

The image correction information may set (or generate) a virtual plane on the user based on the relative position of the projection surface on the user and shape information of the projection surface.

Figure 8:
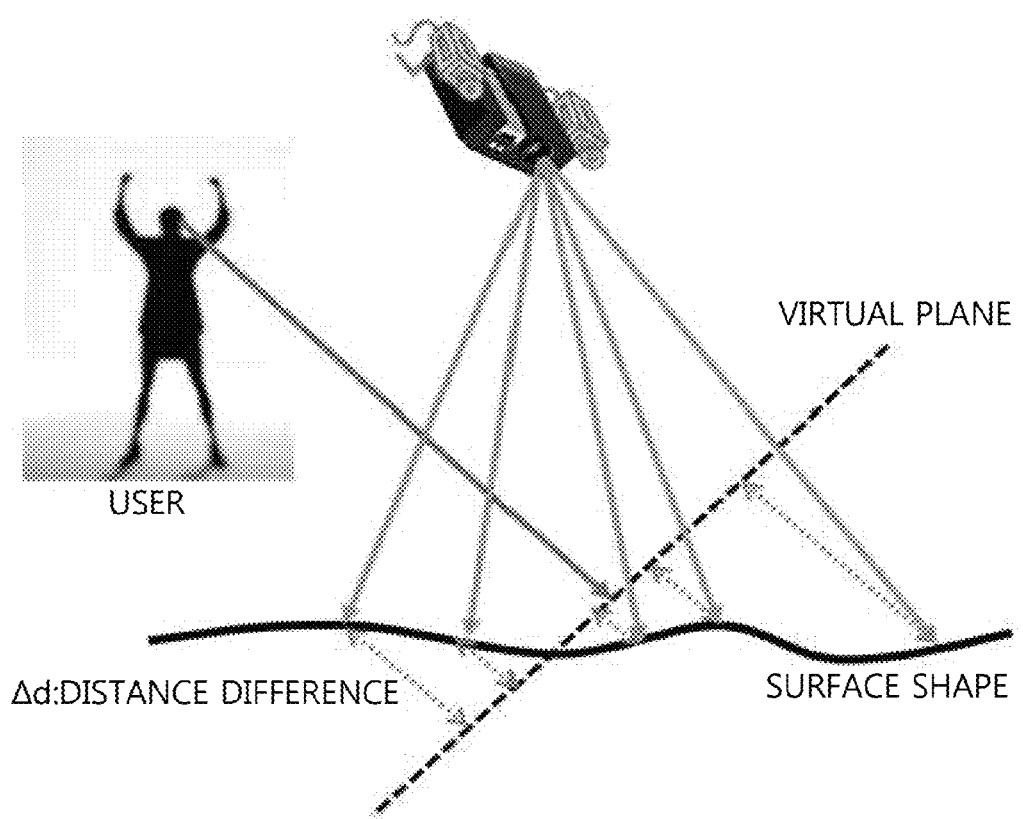
FIG. 8 is an example of a virtual plane according to the present invention.

FIG. 8 is an example of a virtual plane according to the present invention.

Referring to FIG. 8, the image correction device may set a virtual plane based on the relative position of the projection surface on the user and the shape information of the projection surface. In this case, the image projection device may calculate the relative coordinates of the user, the projector, and the projection surface, and set the virtual plane based on the calculated relative coordinates.

The image correction device performs geometric correction for an input image based on the virtual plane. The image correction device may obtain the distance difference Δd for the projection surface and the virtual plane, and may normalize an output image by performing the image conversion for the distance difference.

Referring to FIG. 3 again, the image correction device performs color correction for an input image based on at least one of information on the material of the projection surface and information on the color (S320). The image correction device may generate a difference image between an output image and an input image which are obtained by the above-described at least one image sensor, and then may reconfigure an independent image projection environment by removing the output image elements from the input image. In this case, the image correction device may perform an area division for the projection surface based on at least one of information on the material of the projection surface and information on the color as described above.

Figure 9:
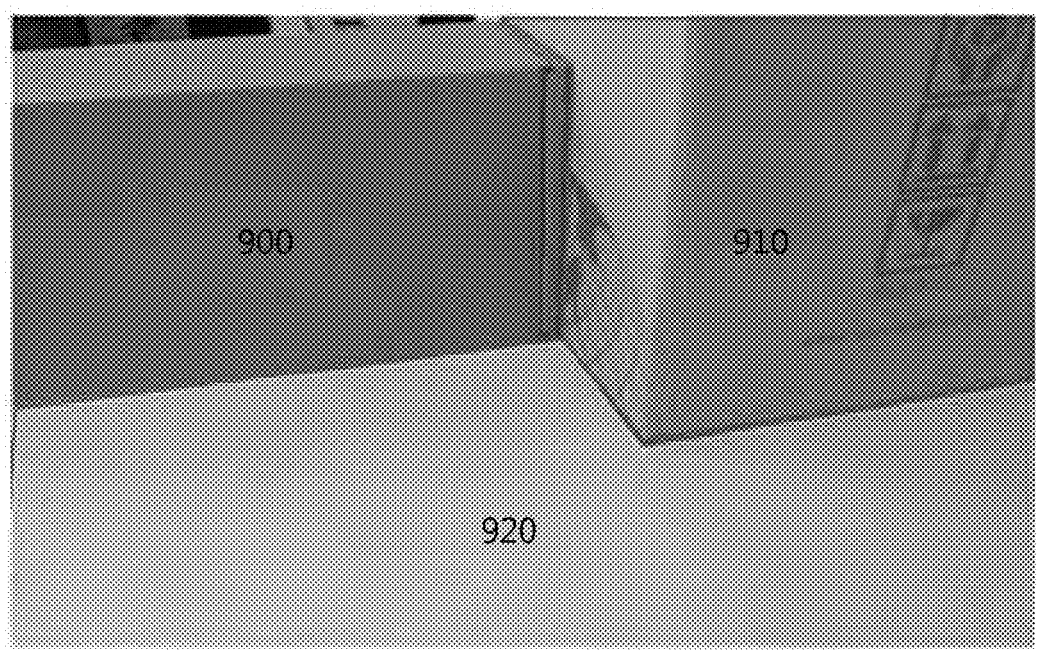
FIG. 9 is an example of performing an area division for a projection surface by utilizing information on color and materials.

FIG. 9 is an example of performing an area division for a projection surface by utilizing information on color and materials. Referring to FIG. 9, the projection surface may be divided into areas 900, 910, and 920 based on information on the material and color. The image correction device may divide the projection surface by analyzing information on the material and color, and may obtain correction information for each divided area, on which the input image is to be projected, by analyzing the color and material for each divided area.

The image correction device may normalize an output image for an input image by adjusting at least one of a red-green-blue (RGB) gain, a brightness gain, and a contrast gain for each divided area.

Furthermore, the image correction device may further perform brightness correction for the input image based on the information on the light condition of the projection surface (S330). The image projection device may adjust the brightness of the input image based on information on the light condition of the projection surface.

Likewise, the image projection device may set a virtual plane in consideration of the projection surface and the user's (or viewer's) position for the projection surface which is not plane and has heterogeneous structure and background color, and as such, a non-distorted image may be outputted by correcting the projected input image.

Figure 10:
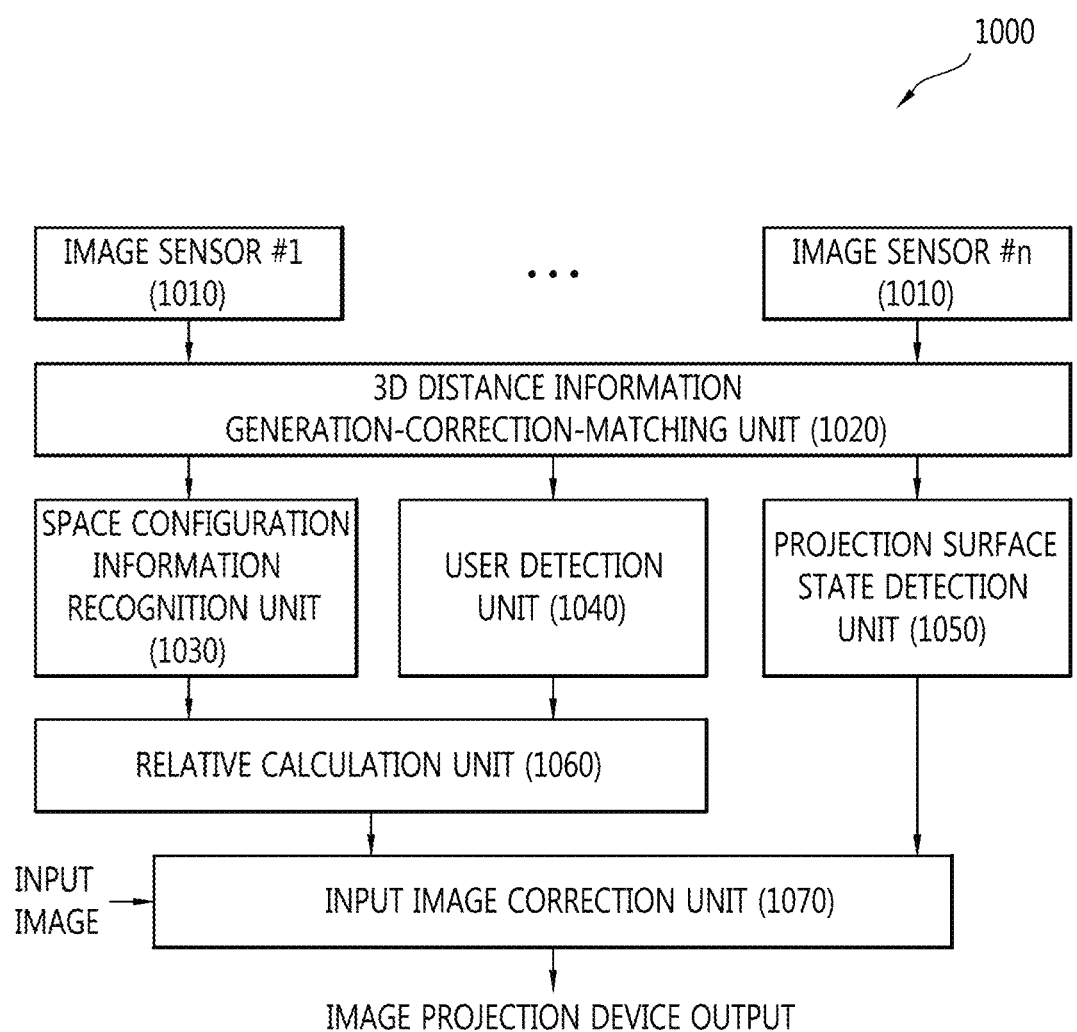
FIG. 10 is a block diagram of an image correction device for correcting an input image according to the present invention.

FIG. 10 is a block diagram of an image correction device for correcting an input image according to the present invention.

Referring to FIG. 10, the image correction device 1000 includes an image sensor 1010, three-dimensional distance information generation-correction-matching unit 1020, a space configuration information recognition unit 1030, a user detection unit 1040, a projection surface state detection unit 1050, a relative coordinate calculation unit 1060, and an input image correction unit 1070. One or more image sensors 1010 included in the image correction device 1000 obtain information on the projection surface and information on the user's position. Here, the user may include a viewer. Here, information on the projection surface may include least one of the location, shape, material, color, and light condition of the projection surface.

The three-dimensional distance information generation-correction-matching unit 1020 may generate distance image information around the image projection device based on information obtained in the image sensor 1010.

The space configuration information recognition unit 1030 obtains space configuration information based on the distance image information. The space configuration information may include location information of the image projection device and the projection surface. The space configuration information recognition unit 1030 may further recognize information on the location and angle of the basic structure such as the wall and the floor of the space where the image projection device ahs been installed.

The user detection unit 1040 detects the user and provides location information of the user. In this case, the user location detection unit 1040 may detect the user based on the distance image information and detect the user's position.

The projection surface state detection unit 1050 detects state information of the projection surface on which the input image is projected. Here, the state information of the projection surface includes information on at least one of the shape, material, color, and light condition of the projection surface. In this case, the projection surface state detection unit 1050 may perform area division on the projection surface based on at least one of the information on the material of the projection surface and the information on the color of the projection surface.

The relative coordinate calculation unit 1060 may calculate the relative position of the projection surface on the user based on the space configuration information and the user's position information, and generate a virtual plane based on the calculated position.

The input image correction unit 1070 corrects the input image based on the state information on the virtual plane and the projection surface. The corrected input image may be outputted to the projection surface through the image projection device.

Figure 11:
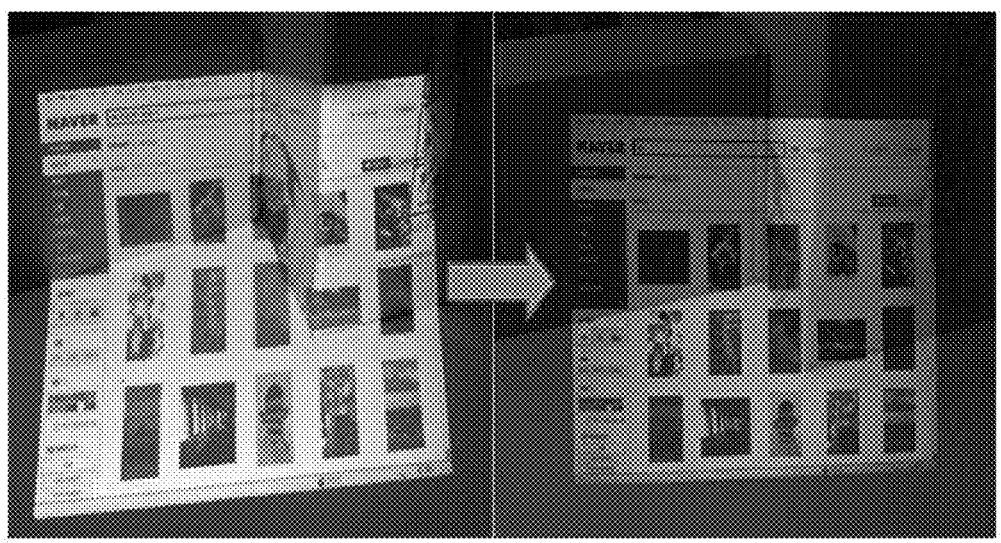
FIG. 11 is an example of performing image correction in an image projection for an arbitrary projection surface according to the present invention.

FIG. 11 is an example of performing image correction in an image projection for an arbitrary projection surface according to the present invention.

Referring to FIG. 11, in the case of the left side where the image correction according to the present invention is not performed, the quality of the image is deteriorated as the projected image is affected by environments such as the shape, color, and brightness of the projection surface, but in the case of the right side where the image correction has been performed, the image distortion of the projected image is reduced and the performance such as the color and brightness is improved by considering the user's time point.

According to the present invention, the conventional image projection device needed a plane screen of a single color for a normal image output, but the present allows the image projection device to output a non-distorted image even to a surface having a heterogeneous structure and background color, thereby significantly enhancing the utilization.

Furthermore, according to the present invention, a virtual plane is set in consideration of a user's (or viewer's) position, and, as such, a projected input image is corrected, thereby providing an optimized image from the perspective of a user.

Figure 12:
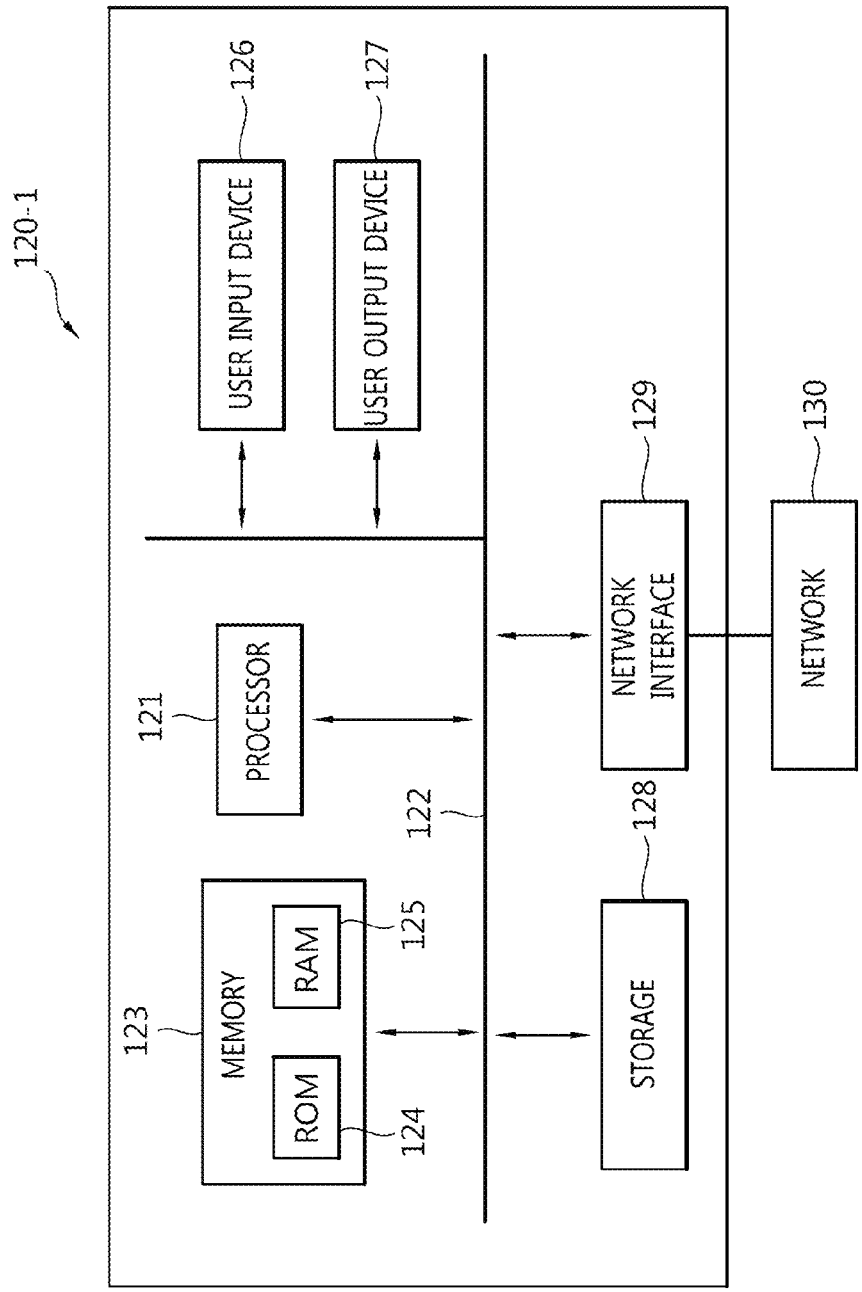
FIG. 12 is an example of an apparatus or a medium on which computer program related to the present invention may be recorded.

An embodiment of the present invention may be implemented in a computer system, e.g., as a computer readable medium. As shown in in FIG. 12, a computer system 120-1 may include one or more of a processor 121, a memory 123, a user input device 126, a user output device 127, and a storage 128, each of which communicates through a bus 122. The computer system 120-1 may also include a network interface 129 that is coupled to a network 130. The processor 121 may be a central processing unit (CPU) or a semiconductor device that executes processing instructions stored in the memory 123 and/or the storage 128. The memory 123 and the storage 128 may include various forms of volatile or non-volatile storage media. For example, the memory may include a read-only memory (ROM) 124 and a random access memory (RAM) 125.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

A person having ordinary skill in the art to which the present invention pertains may change and modify the present invention in various ways without departing from the technical spirit of the present invention. Accordingly, the present invention is not limited to the above-described embodiments and the accompanying drawings.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method of correcting an input image when projecting the input image using an image projection device, the method comprising:
    obtaining information on a projection surface on which the input image is to be projected and information on a user's position through at least one image sensor;
    calculating relative position information between the user and the projection surface based on the information on the projection surface and the information on the user's position;
    setting a virtual plane based on the relative position information between the user and the projection surface;
    performing geometric correction on the input image based on the virtual plane;
    performing color correction on the input image based on the information on the projection surface; and
    performing brightness correction on the input image based on the information on the projection surface.

2. The method of claim 1, wherein the information on the projection surface includes information on at least one of a position, shape, material, color, and light condition of the projection surface.

3. The method of claim 2, wherein an area division of the projection surface is performed based on at least one of information on the material of the projection surface and information on the color of the projection surface, and the color correction on the input image is performed for each divided area.

4. The method of claim 3, wherein the color correction for the input image is performed by adjusting at least one of a red-green-blue (RGB) gain, a brightness gain, and a contrast gain for each divided area.

5. The method of claim 1, wherein the at least one image sensor is based on a stereo vision, time of flight (TOF), or structured light.

6. A method of correcting an input image when projecting the input image using an image projection device, the method comprising:
    obtaining information on a shape and position of a projection surface on which the input image is to be projected through at least one image sensor;
    calculating relative position information between the user and the projection surface based on the information on the shape and the projection surface and information on a user's position;
    setting a virtual plane based on the relative position information between the user and the projection surface; and
    performing geometric correction on the input image based on information on the virtual plane.

7. The method of claim 6, wherein a distance difference Δd between the projection surface and the virtual plane is calculated on the basis of the user, and the geometric correction on the input image is performed based on the Δd.

8. The method of claim 6, further comprising:
    obtaining at least one of information on a material of the projection surface and information on a color of the projection surface through the at least one image sensor; and
    performing color correction on the input image based on at least one of the information on the material of the projection surface and the information on the color of the projection surface.

9. The method of claim 8, wherein an area division on the projection surface is performed based on at least one of the information on the material of the projection surface and the information on the color of the projection surface, and the color correction on the input image is performed for each divided area.

10. The method of claim 9, wherein the color correction for the input image is performed by adjusting at least one of a red-green-blue (RGB) gain, a brightness gain, and a contrast gain for each divided area.

11. The method of claim 8, further comprising:
obtaining information on a light condition of the projection surface through the at least one image sensor; and
performing brightness correction on the input image based on the information on the light condition of the projection surface.

12. The method of claim 11, wherein the at least one image sensor is based on a stereo vision, time of flight (TOF), or structured light.

13. An image correction apparatus for an image projection device, the image correction apparatus comprising:
at least one image sensor which obtains information on a projection surface on which an input image is to be projected through the image projection device, and information on a user's position;
a relative coordinate calculation unit which calculates a relative position of the projection surface based on the information on the projection surface and the information on the user's position, and generates a virtual plane;
a projection surface state detection unit which detects state information on at least one of a shape, material, color, and light condition of the projection surface based on the information on the projection surface; and
an input image correction unit which corrects the input image based on the virtual plane and the state information of the projection surface,
wherein the relative coordinate calculation unit obtains a distance difference Δd for the projection surface and the virtual plane, and the input image correction unit performs geometric correction on the input image based on the distance difference Δd.

14. The image correction apparatus of claim 13, wherein the at least one image sensor obtains information on the projection surface including information on at least one of a position, shape, material, color, and light condition of the projection surface.

15. The image correction apparatus of claim 14, wherein the input image correction unit performs brightness correction on the input image based on the state information on the light condition of the projection surface.

16. An image correction apparatus for an image projection device, the image correction apparatus comprising:
at least one image sensor which obtains information on a projection surface on which an input image is to be projected through the image projection device, and information on a user's position;
a relative coordinate calculation unit which calculates a relative position of the projection surface based on the information on the projection surface and the information on the user's position, and generates a virtual plane;
a projection surface state detection unit which detects state information on at least one of a shape, material, color, and light condition of the projection surface based on the information on the projection surface; and
an input image correction unit which corrects the input image based on the virtual plane and the state information of the projection surface,
wherein the projection surface state detection unit performs area division on the projection surface based on at least one of the state information on the material of the projection surface and the state information on the color of the projection surface, and the input image correction unit performs color correction on the input image for each divided area.

* * * * *